United States Patent
Sahara et al.

(10) Patent No.: US 8,014,811 B2
(45) Date of Patent: Sep. 6, 2011

(54) COMMUNICATION SYSTEM, COMMUNICATION DEVICE AND COMMUNICATION RATE MODIFICATION METHOD

(75) Inventors: Toru Sahara, Kanagawa (JP); Shinobu Fujimoto, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 480 days.

(21) Appl. No.: 12/301,438

(22) PCT Filed: May 11, 2007

(86) PCT No.: PCT/JP2007/059704
§ 371 (c)(1),
(2), (4) Date: Nov. 18, 2008

(87) PCT Pub. No.: WO2007/135868
PCT Pub. Date: Nov. 29, 2007

(65) Prior Publication Data
US 2010/0003926 A1    Jan. 7, 2010

(30) Foreign Application Priority Data
May 19, 2006   (JP) .................... 2006-140807

(51) Int. Cl.
*H04B 7/00* (2006.01)
(52) U.S. Cl. .......................... 455/522; 455/69
(58) Field of Classification Search .................. None
See application file for complete search history.

(56) References Cited

U.S. PATENT DOCUMENTS

| | | | |
|---|---|---|---|
| 6,760,596 B1 | 7/2004 | Fiorini et al. | |
| 2001/0023088 A1* | 9/2001 | Masuda et al. | 438/123 |
| 2003/0096635 A1* | 5/2003 | Uehara et al. | 455/561 |
| 2003/0134654 A1* | 7/2003 | Masuda et al. | 455/522 |
| 2004/0223505 A1 | 11/2004 | Kim et al. | |
| 2005/0053030 A1 | 3/2005 | Zahavi | |
| 2008/0032726 A1* | 2/2008 | Tajima et al. | 455/509 |
| 2008/0153536 A1* | 6/2008 | Yamazaki et al. | 455/522 |
| 2009/0104927 A1* | 4/2009 | Tounai et al. | 455/522 |

(Continued)

FOREIGN PATENT DOCUMENTS

| | | |
|---|---|---|
| EP | 1475985 A2 | 11/2004 |
| JP | 2003-143654 | 5/2003 |

(Continued)

OTHER PUBLICATIONS

European search report for corresponding European application 07743139.3 lists the references above.

*Primary Examiner* — Tuan Lam
(74) *Attorney, Agent, or Firm* — DLA Piper LLP (US)

(57) ABSTRACT

A communication system includes: an RF/IF/BB unit (21) for receiving, in a mobile station device (20), a transmission signal from a base station device; a received power calculation unit (221) for obtaining received power thereof; a communication rate modification unit (23) for changing a communication rate by changing a modulation scheme used by the base station device to modulate the transmission signal in a predetermined case; and a communication rate increase limit unit (27) for limiting the communication rate to be increased by the communication rate modification unit (23), according to received power required for the mobile station device (20) to demodulate the transmission signal and according to the received power obtained when receiving the transmission signal after the communication rate is changed by the communication rate modification unit (23) and predicted based on the received power obtained by the received power calculation unit (221) and based on a decrease amount of a transmission power of a transmission signal decreased by the base station device according to increase of the communication rate by the communication rate modification unit (23).

5 Claims, 11 Drawing Sheets

U.S. PATENT DOCUMENTS

2009/0209276 A1* 8/2009 Wu et al. .................. 455/501

FOREIGN PATENT DOCUMENTS

| | | |
|---|---|---|
| JP | 2003-244070 | 8/2003 |
| JP | 2005-295003 | 10/2005 |
| JP | 2006-041959 | 2/2006 |
| WO | 0038351 A2 | 6/2000 |
| WO | 0141332 A1 | 6/2001 |

* cited by examiner

FIG.4

| COMMUNICATION RATE | NECESSARY RECEIVED POWER A1 | NECESSARY RECEIVED SIGNAL QUALITY B1 | TRANSMISSION POWER DECREASE AMOUNT X | DECREASE-AMOUNT-REFLECTED NECESSARY RECEIVED POWER A2 | DECREASE-AMOUNT-REFLECTED NECESSARY RECEIVED SIGNAL QUALITY B3 |
|---|---|---|---|---|---|
| | | | | | |
| | | | | | |
| | | | | | |

| TRANSMISSION POWER DECREASE AMOUNT X | RECEIVED SIGNAL QUALITY OFFSET VALUE B2 |
|---|---|
| | |
| | |
| | |
| | |

COMMUNICATION SYSTEM, COMMUNICATION DEVICE AND COMMUNICATION RATE MODIFICATION METHOD

TECHNICAL FIELD

The present invention relates to a communication system, a communication device, and a communication rate modification method, and more particularly, to a technology of preventing demodulation from being disturbed after a communication rate is increased.

BACKGROUND ART

In communication systems that employ adaptive modulation, the quality of a signal received by a reception device (received signal quality such as signal to noise ratio (SNR), error vector magnitude (EVM) is judged based on a threshold to determine whether it is allowed to change a communication rate by changing a modulation scheme.

In general, signal distortion significantly influences demodulation in high-rate communications. The distortion increases as transmission power is increased. In order to reduce the signal distortion, some transmission devices decrease the transmission power in response to an increase in communication rate. Therefore, in some cases, received power is decreased after the communication rate is changed.

Patent Document 1 describes a technology of controlling, when multiple terminals are connected to a base station in a spatial multiplexing manner, the uplink transmission power of the terminals according to the propagation environments.
Patent Document 1: JP 2003-244070 A

DISCLOSURE OF THE INVENTION

Problems to be Solved by the Invention

In the above-mentioned conventional technology, however, because whether it is allowed to change the communication rate is determined by judgment of the received signal quality based on a threshold, when the received power is decreased after the communication rate is increased, a reception error occurs in some cases, for example, demodulation is disturbed.

Therefore, an object of the present invention is to provide a communication system, a communication device, and a communication rate modification method, capable of preventing demodulation from being disturbed after the communication rate is increased.

Means for Solving the Problems

In order to solve the above-mentioned problem, a communication system according to the present invention includes: a transmission device; and a reception device, the transmission device including: modulation means for modulating transmission data by using any of a plurality of modulation schemes to generate a transmission signal; transmission means for sending the transmission signal generated by the modulation means; and transmission power decreasing means for decreasing transmission power used when the transmission means sends the transmission signal by a predetermined change amount, in a case where a communication rate is increased by changing the modulation scheme used by the modulation means; the reception device including reception means for receiving the transmission signal sent by the transmission means, characterized in that the communication system further includes: received power information acquisition means for obtaining received power information indicating received power obtained when the transmission signal is received by the reception means; communication rate modification means for changing, in a predetermined case, the communication rate by changing the modulation scheme used by the modulation means; and communication rate increase limit means for limiting the communication rate to be increased by the communication rate modification means, according to received power required for the reception device to demodulate the transmission signal received by the reception means and according to the received power obtained when the reception means receives the transmission signal after the communication rate is changed by the communication rate modification means and predicted based on the received power information obtained by the received power information acquisition means and based on the change amount of the transmission power by the transmission power decreasing means.

Therefore, when the predicted received power after the communication rate is increased is lower than the necessary received power, the change in the communication rate can be limited, thereby preventing demodulation from being disturbed after the communication rate is increased.

Further, the communication system described above may further include: received signal quality information acquisition means for obtaining received signal quality information indicating received signal quality obtained when the transmission signal is received by the reception means; storage means for storing necessary received signal quality information indicating necessary received signal quality being received signal quality required for the reception device to demodulate the transmission signal received by the reception means, in association with communication rate information indicating the communication rate; and judgment means for performing, for the received signal quality indicated by the received signal quality information obtained by the received signal quality information acquisition means, judgment based on a threshold, with the necessary received signal quality indicated by the necessary received signal quality information stored in the storage means in association with the communication rate information indicating the communication rate changed by the communication rate modification means or high received-signal quality that is higher than this necessary received signal quality being used as the threshold, in which: the communication rate modification means may change the communication rate according to a judgment result of the judgment means; in a case where the predicted received power is not larger than the received power required for the reception device to demodulate the transmission signal received by the reception means, the communication rate increase limit means may limit the communication rate to be increased by the communication rate modification means, by setting the threshold used in the judgment performed by the judgment means as the high received-signal quality; and in a case where the predicted received power is larger than the received power required for the reception device to demodulate the transmission signal received by the reception means, the communication rate increase limit means may set the threshold used in the judgment performed by the judgment means as the necessary received signal quality.

The communication rate is conventionally changed through judgment of received signal quality based on a threshold. Therefore, in the above-mentioned communication system, the threshold used in the judgment is set as the high received-signal quality, thereby preventing the communication rate from being increased until the received power corresponding to the high received-signal quality is obtained.

However, depending on the hardware of the transmission device, the distortion of a transmission signal is increased as the transmission power is increased, thereby causing the received signal quality to be saturated in some cases. In those cases, the correlation between the received signal quality and the received power is lost.

In those cases, if the threshold used in the judgment is set as the high received-signal quality, in spite of the fact that the predicted received power is larger than the received power required for the reception device to perform demodulation, and that the received signal quality is higher than the necessary received signal quality, the increase in communication rate may be limited.

According to the above-mentioned communication system, when the predicted received power is larger than the received power required for the reception device to perform demodulation, the received signal quality indicated by the necessary received signal quality information is set as the threshold, allowing the communication rate to be appropriately increased.

Further, in the communication system, the high received-signal quality may be determined based on the necessary received signal quality and the change amount of the transmission power by the transmission power decreasing means.

Therefore, when the threshold used in the judgment of the received signal quality is set as the high received-signal quality, the communication rate can be prevented from being increased until the necessary received power is obtained after the communication rate is changed.

Further, the communication device according to the present invention is characterized by including: reception means for receiving a transmission signal sent by a transmission device; received power information acquisition means for obtaining received power information indicating received power obtained when the transmission signal is received by the reception means; communication rate modification means for changing, in a predetermined case, a communication rate by changing a modulation scheme used by the transmission device to modulate the transmission signal; and communication rate increase limit means for limiting the communication rate to be increased by the communication rate modification means, according to received power required for the reception device to demodulate the transmission signal received by the reception means and according to the received power obtained when the reception means receives the transmission signal after the communication rate is changed by the communication rate modification means and predicted based on the received power information obtained by the received power information acquisition means and based on a change amount of the transmission power of the transmission signal decreased by the transmission device according to an increase of the transmission rate by the communication rate modification means.

Further, a communication rate modification method according to the present invention is characterized by including: a modulation step of modulating, in a transmission device, transmission data by using any of a plurality of modulation schemes, to generate a transmission signal; a transmission step of sending, in the transmission device, the transmission signal generated in the modulation step; a transmission power decreasing step of decreasing transmission power used when the transmission signal is sent in the transmission step, by a predetermined change amount, in a case where a communication rate is increased by changing the modulation scheme used in the modulation step; a reception step of receiving, in a reception device, the transmission signal sent by the transmission means; a received power information acquisition step of obtaining received power information indicating received power obtained when the transmission signal is received in the reception step; a communication rate modification step of changing, in a predetermined case, the communication rate by changing the modulation scheme used in the modulation step; and a communication rate increase limit step of limiting the communication rate to be increased in the communication rate modification step, according to received power required for the reception device to demodulate the transmission signal received in the reception step and according to the received power obtained when the transmission signal is received in the reception step after the communication rate is changed in the communication rate modification step and predicted based on the received power information obtained in the received power information acquisition step and based on the change amount of the transmission power in the transmission power decreasing step.

BRIEF DESCRIPTION OF THE DRAWINGS

FIG. 4 is a diagram showing a threshold storage table according to the embodiment of the present invention.

BEST MODE FOR CARRYING OUT THE INVENTION

An embodiment of the present invention will be described with reference to the drawings.

Figure 1:
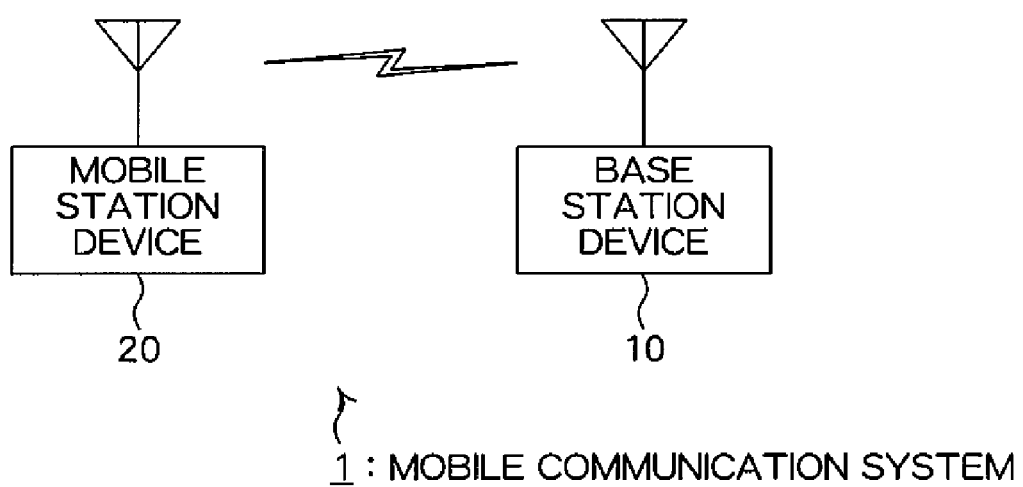
FIG. 1 is a diagram showing a system configuration of a mobile communication system according to an embodiment of the present invention.

FIG. 1 is a diagram showing a system configuration of a mobile communication system 1 according to this embodiment. As shown in FIG. 1, the mobile communication system 1 includes a base station device 10 and a mobile station device 20.

Each of the base station device 10 and the mobile station device 20 is a computer provided with a CPU and a memory. The CPU is a processing unit for executing a program stored in the memory, controls each unit included in the device, and realizes functions to be described later. The memory stores data and the program to implement this embodiment. The memory also functions as a working memory for the CPU.

The base station device 10 and the mobile station device 20 perform radio communications therebetween while controlling a communication rate through adaptive modulation. The communication rate is controlled through judgment of received signal quality based on a threshold. Hereinafter, a description will be given of a case where the communication rate of a radio signal to be sent by radio from the base station device 10 is controlled by using the judgment, based on a threshold, of received signal quality performed when the mobile station device 20 receives a radio signal sent by radio from the base station device 10.

Hereinafter, with reference to functional blocks of the base station device 10 and the mobile station device 20, functions of the devices according to this embodiment will be described in detail.

Figure 2:
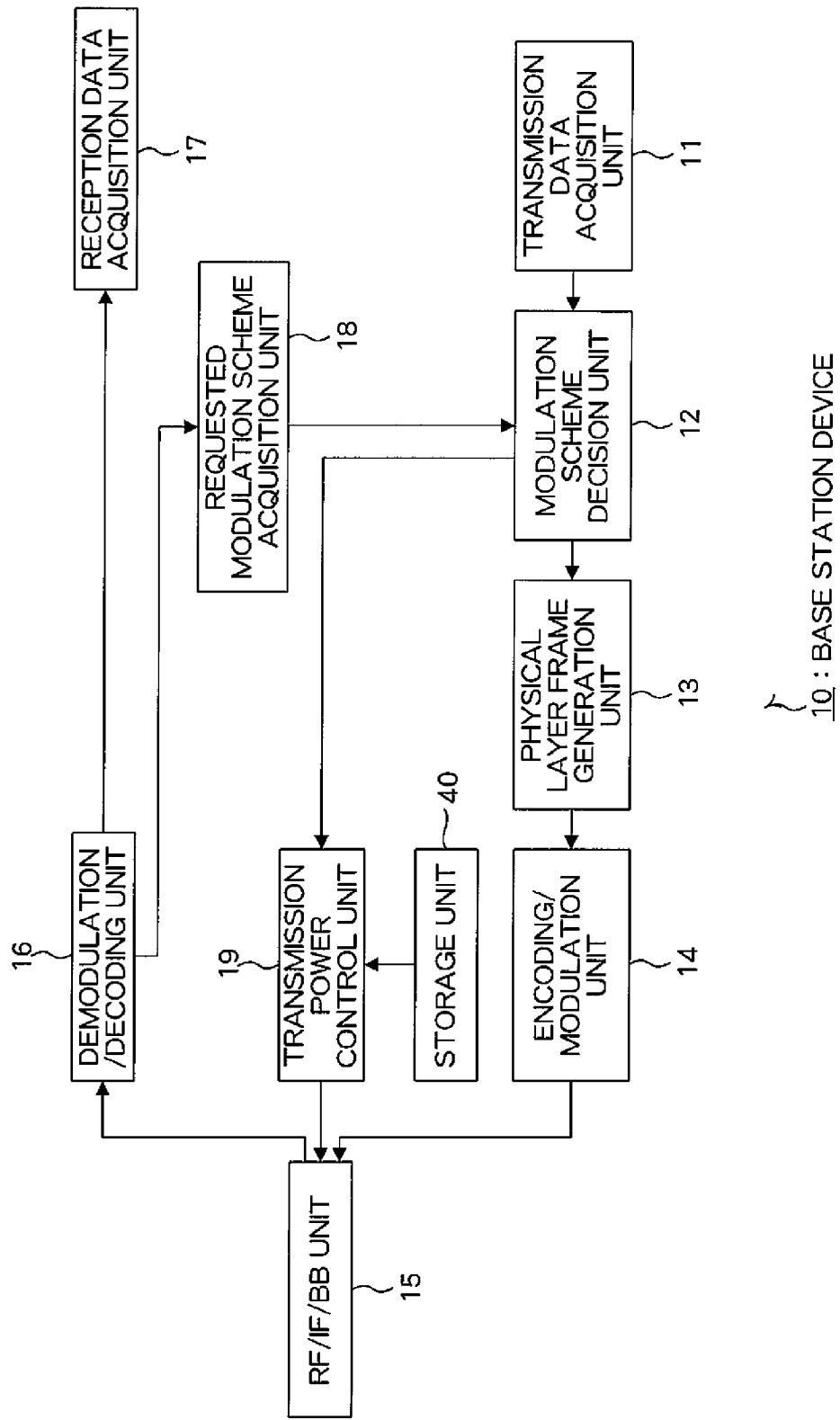
FIG. 2 is a diagram showing a system configuration of a base station device according to the embodiment of the present invention.

FIG. 2 is a diagram showing a functional block of the base station device 10. As shown in FIG. 2, the base station device 10 functionally includes a transmission data acquisition unit 11, a modulation scheme decision unit 12, a physical layer frame generation unit 13, an encoding/modulation unit 14, a radio frequency (RF)/inter-frequency (IF)/base band (BB) unit 15, a demodulation/decoding unit 16, a reception data acquisition unit 17, a requested modulation scheme acquisition unit 18, a transmission power control unit 19, and a storage unit 40.

Figure 3:
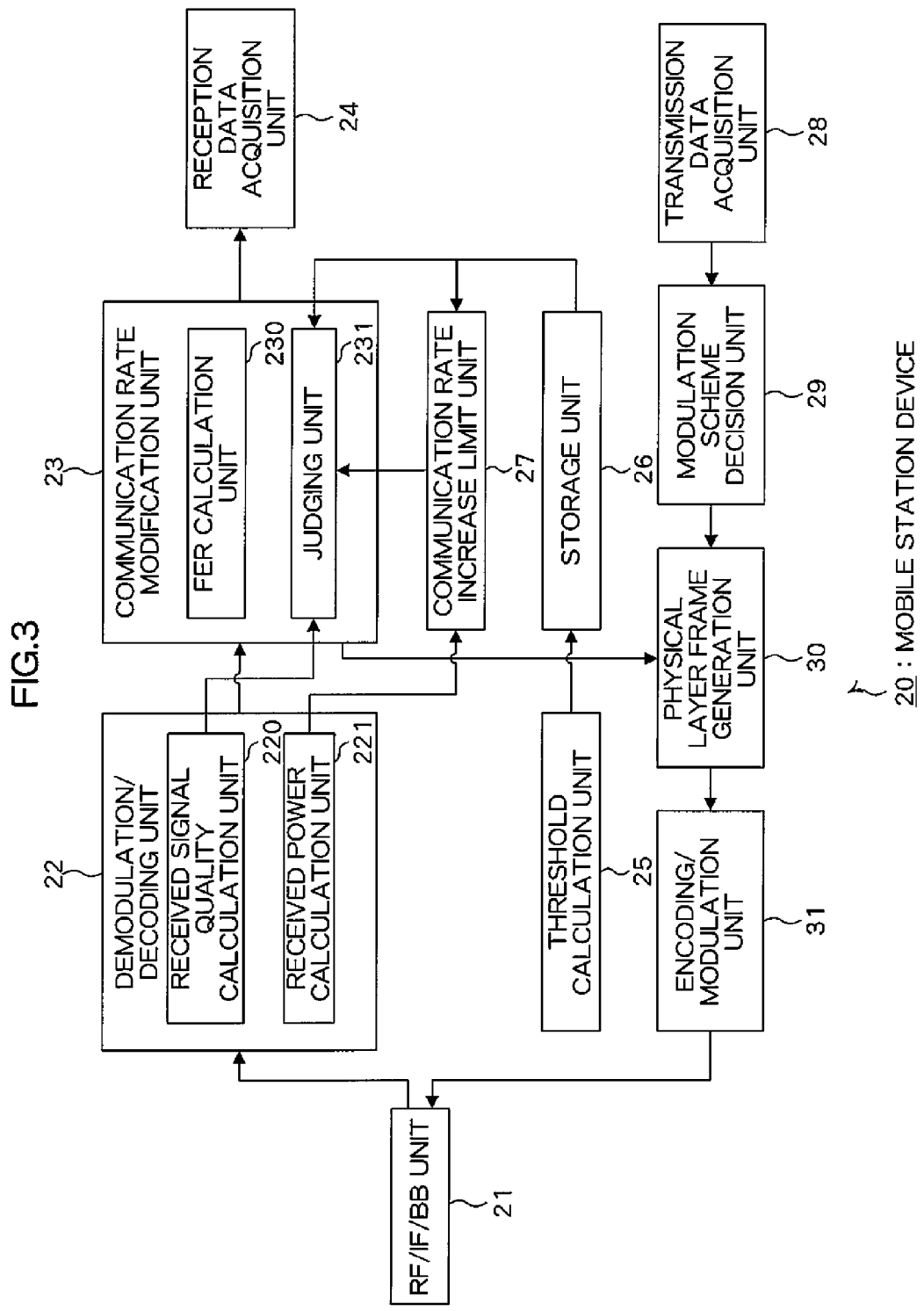
FIG. 3 is a diagram showing a system configuration of a mobile station device according to the embodiment of the present invention.

FIG. 3 is a diagram showing a functional block of the mobile station device 20. As shown in FIG. 3, the mobile station device 20 functionally includes an RF/IF/BB unit 21, a demodulation/decoding unit 22, a communication rate modification unit 23, a reception data acquisition unit 24, a threshold calculation unit 25, a storage unit 26, a communication rate increase limit unit 27, a transmission data acquisition unit 28, a modulation scheme decision unit 29, a physical layer frame generation unit 30, and an encoding/modulation unit 31. The demodulation/decoding unit 22 further includes a received signal quality calculation unit 220 and a received power calculation unit 221. The communication rate modification unit 23 further includes a frame error rate (FER) calculation unit 230 and a judging unit 231.

The transmission data acquisition unit 11 obtains transmission data to be sent to the mobile station device 20. The modulation scheme decision unit 12 decides a modulation scheme used to modulate the transmission data obtained by the transmission data acquisition unit 11, according to an instruction of the requested modulation scheme acquisition unit 18, to be described later.

The physical layer frame generation unit 13 adds a physical layer header to the transmission data obtained by the transmission data acquisition unit 11, and outputs the transmission data to which the physical layer header has been added, to the encoding/modulation unit 14. Note that the physical layer frame generation unit 13 incorporates modulation scheme information indicating the modulation scheme decided by the modulation scheme decision unit 12, in the physical layer header thus added.

The encoding/modulation unit 14 encodes the transmission data to which the physical layer header has been added, received from the physical layer frame generation unit 13, according to a predetermined encoding method, to obtain encoded data. The encoding/modulation unit 14 handles a plurality of modulation schemes. The encoding/modulation unit 14 modulates, of the encoded data, a part that contains the above-mentioned modulation scheme information (predetermined-modulation part) according to a predetermined modulation scheme, and modulates the other part (adaptive-modulation part) according to the modulation scheme decided by the modulation scheme decision unit 12. The encoding/modulation unit 14 generates and obtains a transmission signal through the modulation described above.

The RF/IF/BB unit 15 sends, by radio, the transmission signal obtained by the encoding/modulation unit 14, according to a superheterodyne system.

The transmission power control unit 19 controls transmission power used when the RF/IF/BB unit 15 sends the transmission signal. In particular, when a communication rate is increased in response to a change of the modulation scheme used by the encoding/modulation unit 14, the transmission power control unit 19 decreases the transmission power used when the RF/IF/BB unit 15 sends the transmission signal, by a predetermined decrease amount (change amount).

Specifically, the storage unit 40 stores a transmission power decrease amount table. The transmission power decrease amount table is a table that stores the changed communication rate and the decrease amount in association with each other. When the modulation scheme used by the encoding/modulation unit 14 is changed, the transmission power control unit 19 reads the decrease amount stored in association with the changed communication rate from the transmission power decrease amount table. Then, the transmission power control unit 19 decreases the transmission power used when the RF/IF/BB unit 15 sends the transmission signal, by the read decrease amount.

The RF/IF/BB unit 21 receives the transmission signal sent by radio from the base station device 10, according to the superheterodyne system, and outputs the transmission signal to the demodulation/decoding unit 22.

The demodulation/decoding unit 22 demodulates the predetermined-modulation part of the transmission signal received from the RF/IF/BB unit 21, according to the predetermined modulation scheme. The demodulation/decoding unit 22 obtains, from data obtained through the demodulation, the above-mentioned modulation scheme information, and demodulates the adaptive-modulation part of the transmission signal received from the RE/IF/BB unit 21, according to the modulation scheme indicated by the obtained modulation scheme information. The demodulation/decoding unit 22 further decodes the encoded data obtained through the demodulation, according to the predetermined encoding method to obtain the physical layer header and the transmission data. The reception data acquisition unit 24 obtains the transmission data obtained by the demodulation/decoding unit 22, as reception data.

The received signal quality calculation unit 220 calculates received signal quality information indicating the quality (received signal quality) of the transmission signal received from the RF/IF/BB unit 21, and outputs the received signal quality information to the judging unit 231. SNR and EVM are concrete examples of the received signal quality information. Note that the FER calculation unit 230 calculates the FER (frame error rate) of the reception data, and the FER may be used as the received signal quality information.

The received power calculation unit 221 calculates received power information indicating the amplitude (received power) of the transmission signal received from the RF/IF/BB unit 21, and outputs the received power information to the communication rate increase limit unit 27.

In a predetermined case, the communication rate modification unit 23 changes the communication rate by changing the modulation scheme used by the encoding/modulation unit 14. Hereinafter, a function used for the change will be specifically described.

Figures 5, 6:
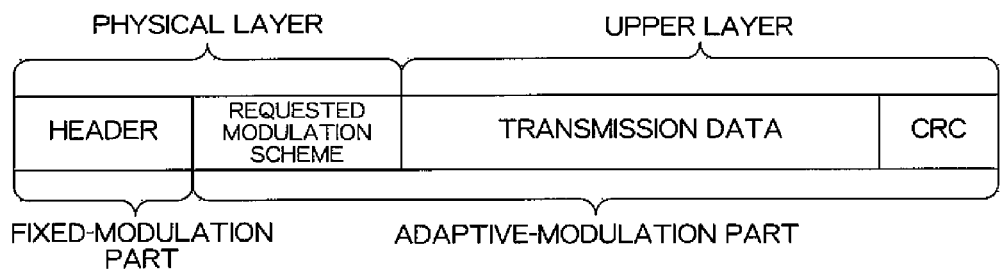
FIG. 5 is a diagram showing a table associating a transmission power decrease amount with a received signal quality offset value, according to the embodiment of the present invention.
FIG. 6 is a diagram showing a frame structure of a transmission signal according to the embodiment of the present invention.

The storage unit 26 stores a threshold storage table shown in FIG. 4 and a table associating a transmission power decrease amount with a received signal quality offset value, shown in FIG. 5.

As shown in FIG. 4, the threshold storage table stores a communication rate, a necessary received power A1, a necessary received signal quality B1, a transmission power decrease amount X, a decrease-amount-reflected necessary received power A2, and a decrease-amount-reflected necessary received signal quality B3, in association with one another.

The necessary received power A1 is information indicating the received power required to demodulate a transmission signal having a corresponding communication rate, received by the RF/IF/BB unit 21. The necessary received signal quality B1 is information indicating the received signal quality required to demodulate a transmission signal having a corresponding communication rate, received by the RF/IF/BB unit 21.

The transmission power decrease amount X is information indicating the decrease amount by which the transmission power is decreased by the transmission power control unit 19 when the communication rate is changed to a corresponding communication rate. When all mobile station devices 20 use the same transmission power decrease amount X, the transmission power decrease amount X may be stored in the threshold storage table in advance as station data of the base station device 10. On the other hand, when each mobile station device 20 uses a different transmission power decrease amount X, it is preferred that the mobile station device 20 send the content stored in the transmission power decrease amount table to the base station device 10 at the start of communication with the base station device 10. In this case, the base station device 10 stores the threshold storage table for each mobile station device 20. Then, based on the transmission power decrease amount table received from the mobile station device 20, the base station device 10 writes the transmission power decrease amount X to the threshold storage table stored for this mobile station device 20.

The decrease-amount-reflected necessary received power A2 is a value obtained by adding the transmission power decrease amount X and the necessary received power B1. In other words, the decrease-amount-reflected necessary received power A2 is calculated by adding A1 and X.

The decrease-amount-reflected necessary received signal quality B3 is determined based on the transmission power decrease amount X and the necessary received signal quality B1. Specifically, when the communication rate is changed, the transmission power is decreased under the control of the transmission power control unit 19. Therefore, in order to realize the necessary received power after the communication rate is changed, the received power before the communication rate is changed needs to be larger than the necessary received power after the communication rate is changed, by the transmission power decrease amount X. This value is the decrease-amount-reflected necessary received power A2. However, because the base station device 10 judges whether it is allowed to change the communication rate, through judgment of the received signal quality based on a threshold, it is impossible to judge whether it is allowed to change the communication rate, by directly judging whether the received power is larger than the decrease-amount-reflected necessary received power A2. Therefore, on the assumption that there is a correlation between the received power and the received signal quality, the base station device 10 sets, as the threshold used in the judgment, the decrease-amount-reflected necessary received signal quality B3 obtained by increasing the necessary received signal quality after the communication rate is changed, by an amount corresponding to the transmission power decrease amount X.

Specifically, the threshold calculation unit 25 calculates the decrease-amount-reflected necessary received signal quality B3 based on the transmission power decrease amount X and the necessary received signal quality B1, stored in the threshold storage table, and based on the table associating a transmission power decrease amount with a received signal quality offset value. Hereinafter, a detailed description will be given.

As shown in FIG. 5, the table associating a transmission power decrease amount with a received signal quality offset value stores the transmission power decrease amount X and a received signal quality offset value B2 in association with each other. The base station device 10 stores the table associating a transmission power decrease amount with a received signal quality offset value, in advance as station data.

The threshold calculation unit 25 first obtains the transmission power decrease amount X stored in the threshold storage table, for the decrease-amount-reflected necessary received signal quality B3 to be calculated. Then, the threshold calculation unit 25 obtains the received signal quality offset value B2 stored in the table associating a transmission power decrease amount with a received signal quality offset value, in association with the obtained decrease-amount-reflected necessary received power A2. Further, the threshold calculation unit 25 obtains the necessary received signal quality B1 stored in the threshold storage table, for the decrease-amount-reflected necessary received signal quality B3 to be calculated. Then, the threshold calculation unit 25 adds the obtained received signal quality offset value B2 to the obtained necessary received signal quality B1, to obtain the decrease-amount-reflected necessary received signal quality B3. In short, the threshold calculation unit 25 calculates the decrease-amount-reflected necessary received signal quality B3 by adding B1 and B2. The threshold calculation unit 25 writes the thus calculated decrease-amount-reflected necessary received signal quality B3 to the threshold storage table.

The judging unit 231 performs judgment, based on a threshold, of the received signal quality indicated by the received signal quality information obtained by the received signal quality calculation unit 220. As the threshold, any one of the necessary received signal quality indicated by the necessary received signal quality B1 stored in the threshold storage table in association with communication rate information indicating the changed communication rate and high received-signal quality that is higher than this necessary received signal quality B1 is used. Note that it is preferred that the received signal quality indicated by the decrease-amount-reflected necessary received signal quality B3 stored in the threshold storage table be used as the high received-signal quality.

The communication rate modification unit 23 changes the communication rate according to the judgment result of the judging unit 231. Specifically, when the judgment result of the judging unit 231 is affirmative, a process to increase the communication rate (to be described later) is performed. In other words, when the received signal quality indicated by the received signal quality information obtained by the received signal quality calculation unit 220 is higher than the threshold, the process to increase the communication rate is performed. When the judgment result of the judging unit 231 is negative, no special process is performed. Note that, in a predetermined case, the communication rate modification unit 23 also performs a process to decrease the communication rate.

The communication rate increase limit unit 27 limits the communication rate to be increased by the communication rate modification unit 23, according to the necessary received power A1 and received power which is to be obtained when the RF/IF/BB unit 21 receives a transmission signal after the communication rate is changed by the communication rate modification unit 23 and which is predicted based on the received power information obtained by the received power calculation unit 221 and the transmission power decrease amount X.

Specifically, when the received power indicated by the received power information obtained by the received power calculation unit 221 is not larger than the decrease-amount-reflected necessary received power A2 stored in the threshold storage table in association with the communication rate changed by the communication rate modification unit 23, the communication rate increase limit unit 27 sets the threshold used in the judgment performed by the judging unit 231 as the high received signal quality, thereby limiting the communication rate to be increased by the communication rate modification unit 23. On the other hand, when the received power indicated by the received power information obtained by the received power calculation unit 221 is larger than the decrease-amount-reflected necessary received power A2, the communication rate increase limit unit 27 sets the threshold used in the judgment performed by the judging unit 231 as the necessary received signal quality.

From another point of view, when the predicted received power is not larger than the necessary received power A1, the communication rate increase limit unit 27 sets the threshold used in the judgment performed by the judging unit 231 as the high received-signal quality, thereby limiting the communication rate to be increased by the communication rate modification unit 23. On the other hand, when the predicted received power is larger than the necessary received power A1, the communication rate increase limit unit 27 sets the threshold used in the judgment performed by the judging unit 231 as the necessary received signal quality.

Hereinafter, functions used for the process to increase the communication rate, performed by the communication rate modification unit 23, will be described.

The transmission data acquisition unit 28, the modulation scheme decision unit 29, the physical layer frame generation unit 30, the encoding/modulation unit 31, and the RF/IF/BB unit 21 generate a transmission signal and send the transmission signal by radio, in the same way as the transmission data acquisition unit 11, the modulation scheme decision unit 12, the physical layer frame generation unit 13, the encoding/modulation unit 14, and the RF/IF/BB unit 15.

The communication rate modification unit 23 incorporates information used to cause the base station device 10 to increase the communication rate, in the physical layer header added then by the physical layer frame generation unit 30. Specifically, information indicating a modulation scheme that realizes the changed communication rate is incorporated in a requested modulation scheme field in the physical layer header.

FIG. 6 is a diagram showing an example format of a transmission signal, in which the requested modulation scheme field is included. As shown in FIG. 6, the transmission signal includes a physical layer and an upper layer. The physical layer includes the header and the requested modulation scheme field. The upper layer includes transmission data. Note that CRC indicates cyclic redundancy code and is used for error correction and FER calculation.

The demodulation/decoding unit 16 and the reception data acquisition unit 17 obtain reception data in the same way as the demodulation/decoding unit 22 and the reception data acquisition unit 24.

The requested modulation scheme acquisition unit 18 reads information contained in the requested modulation scheme field from the physical layer header obtained then by the demodulation/decoding unit 16. Then, the requested modulation scheme acquisition unit 18 instructs the modulation scheme decision unit 12 to use the modulation scheme indicated by the read information, to modulate transmission data obtained by the transmission data acquisition unit 11.

The process to increase the communication rate is performed through the above-mentioned functions.

Hereinafter, the above-mentioned processes of the mobile station device 20 will be described with reference to process flows.

Figure 7:
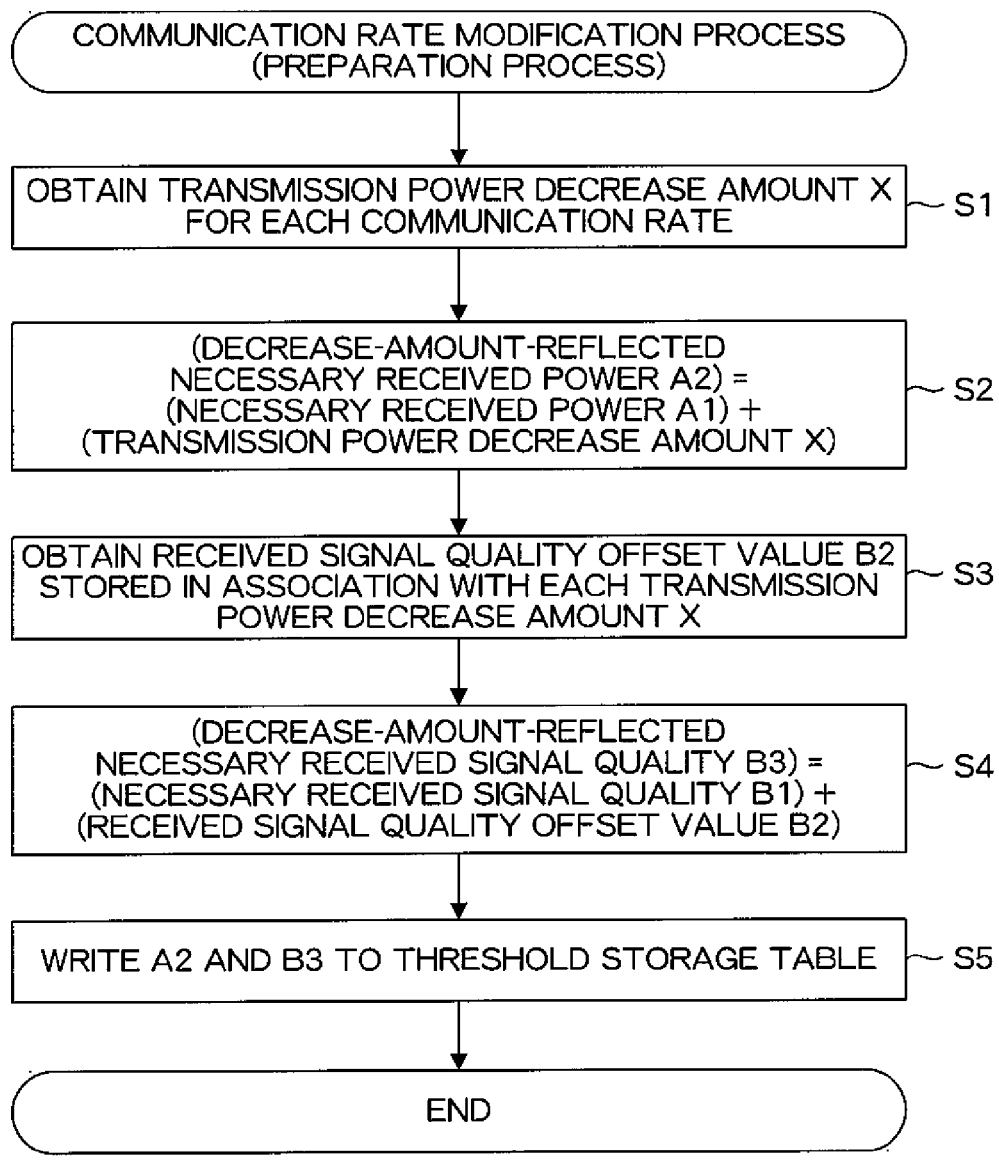
FIG. 7 is a diagram showing a process flow of the mobile station device according to the embodiment of the present invention.

FIG. 7 is a diagram showing a process flow of a preparation process performed by the mobile station device 20 in order to realize a communication rate modification process. As shown in FIG. 7, the mobile station device 20 first obtains the transmission power decrease amount X for each communication rate (S1). The mobile station device 20 writes the thus obtained transmission power decrease amount X to the threshold storage table.

Next, the mobile station device 20 calculates the decrease-amount-reflected necessary received power A2 by adding A1 and X (S2).

Further, the mobile station device 20 obtains the received signal quality offset value B2 stored in association with the transmission power decrease amount X, from the table associating a transmission power decrease amount with a received signal quality offset value (S3). Then, the mobile station device 20 calculates the decrease-amount-reflected necessary received signal quality B3 by adding B1 and B2 (S4).

The mobile station device 20 writes the thus calculated A2 and B3 to the threshold storage table (S5).

Figure 8:
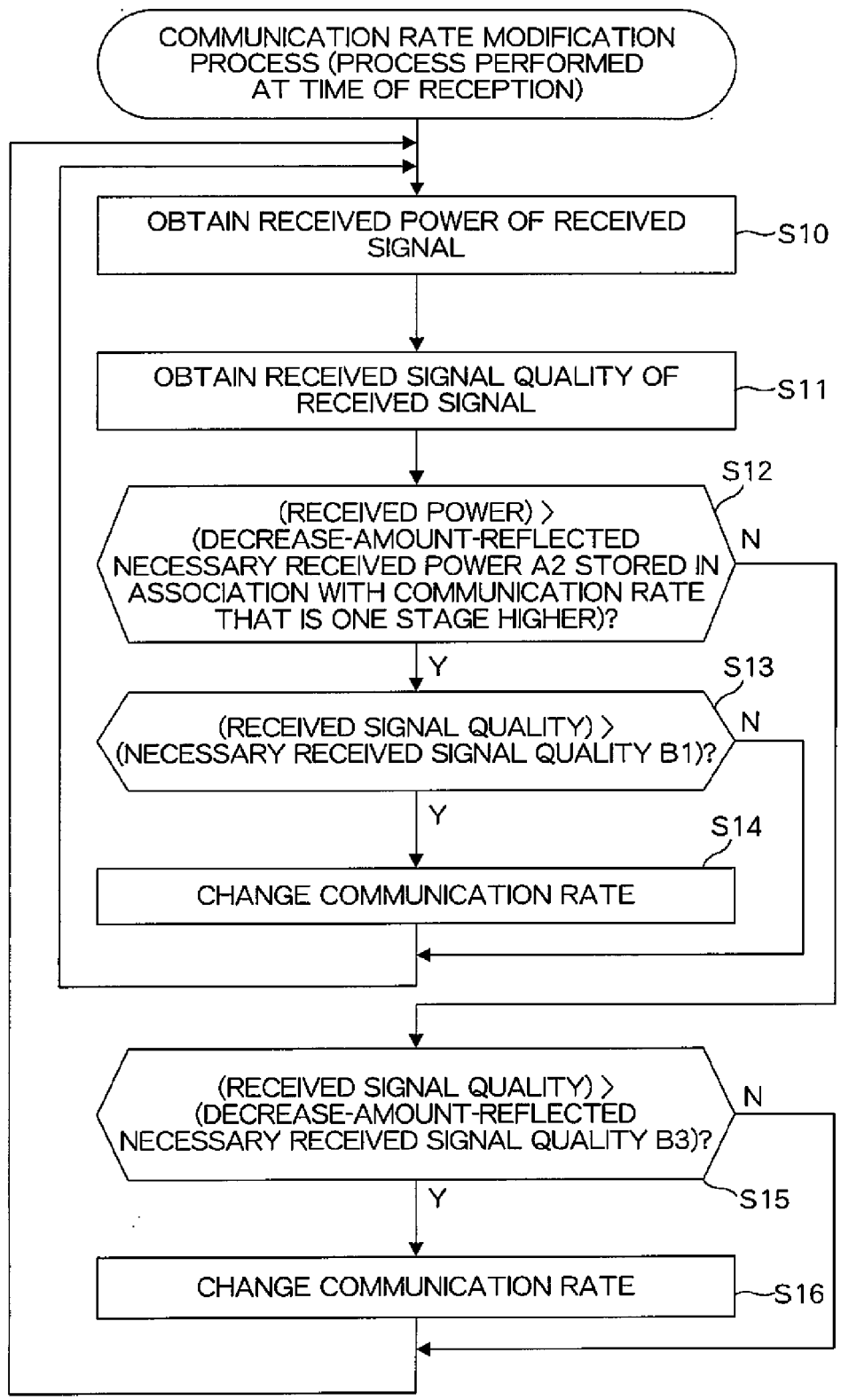
FIG. 8 is a diagram showing a process flow of the mobile station device according to the embodiment of the present invention.

FIG. 8 is a diagram showing a process flow of the communication rate modification process performed by the mobile station device 20. As shown in FIG. 8, the mobile station device 20 first obtains the received power of a received signal (S1), and obtains the received signal quality thereof (S11). Then, the mobile station device 20 judges whether the received power obtained in S10 is larger than the decrease-amount-reflected necessary received power A2 stored in association with a communication rate that is one stage higher than the current communication rate (S12).

When the judgment result obtained in S12 is affirmative, the mobile station device 20 judges whether the received signal quality obtained in S11 is higher than the necessary received signal quality B1 (S13). When the judgment result obtained in S13 is affirmative, the mobile station device 20 changes the communication rate (S14).

When the judgment result obtained in S12 is not affirmative, the mobile station device 20 judges whether the received signal quality obtained in S15 is higher than the decrease-amount-reflected necessary received signal quality B3 (S15). When the judgment result obtained in S15 is affirmative, the mobile station device 20 changes the communication rate (S16).

Figure 9:
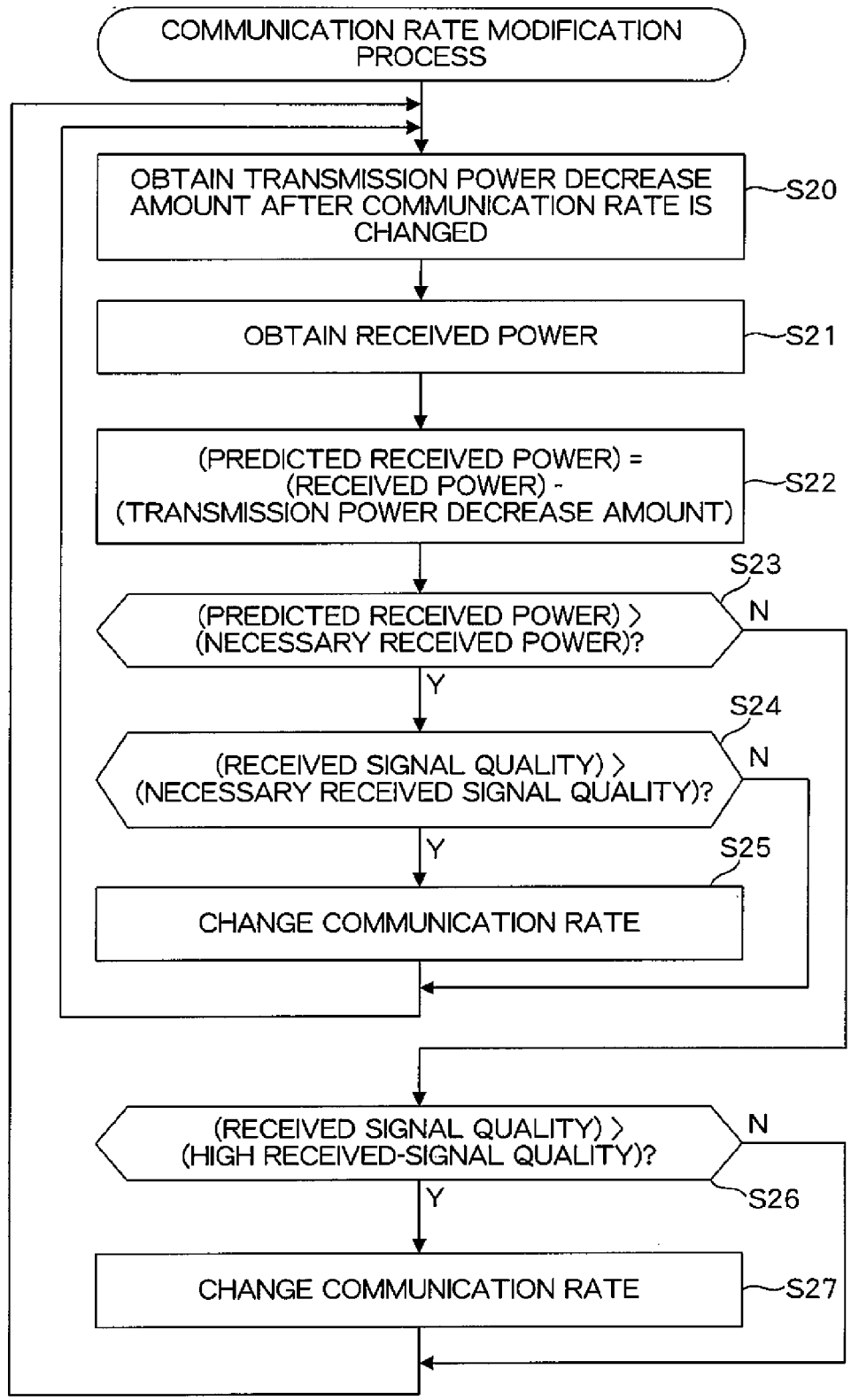
FIG. 9 is a diagram showing a process flow of the mobile station device according to the embodiment of the present invention.

FIG. 9 shows a modification example of the process flows shown in FIGS. 7 and 8. In the example shown in FIG. 9, the mobile station device 20 first obtains a decrease amount of the transmission power, to be used when the communication rate is increased by one stage (S20). The mobile station device 20 further obtains the received power of a received signal (S21). Then, the mobile station device 20 calculates a predicted received power by subtracting the transmission power decrease amount obtained in S20 from the received power obtained in S21 (S22).

Next, the mobile station device 20 judges whether the predicted received power is larger than received power (necessary received power) required when the communication rate obtained after the communication rate is changed is increased by one stage (S23).

When the judgment result obtained in S23 is affirmative, the mobile station device 20 judges whether the received signal quality of the received signal is higher than received signal quality (necessary received signal quality) required when the communication rate is increased by one stage (S24). When the judgment result obtained in S24 is affirmative, the mobile station device 20 changes the communication rate (S25).

When the judgment result obtained in S23 is not affirmative, the mobile station device 20 judges whether the received signal quality of the received signal is higher than received signal quality (high received-signal quality) that is higher than the received signal quality (necessary received signal quality) required when the communication rate is increased by one stage (S26). When the judgment result obtained in S26 is affirmative, the mobile station device 20 changes the communication rate (S27).

As described above, according to the mobile communication system 1, when the predicted received power after the communication rate is increased is smaller than the necessary received power, the change in communication rate can be limited, thereby preventing demodulation from being disturbed after the communication rate is increased.

Further, when the threshold used in the judgment is set as the high received-signal quality (decrease-amount-reflected received signal quality), the communication rate is prevented from being increased until received power corresponding to the high received-signal quality is obtained. Further, when the predicted received power is larger than received power required for the mobile station device 20 to perform demodulation, the necessary received signal quality is set as the threshold, thereby allowing the communication rate to be appropriately increased.

Further, because the threshold used in the judgment of the received signal quality is set as the decrease-amount-reflected received signal quality, which reflects a transmission power decrease amount, the communication rate can be prevented from being increased until the necessary received power is obtained after the communication rate is increased.

An operation and effect of this embodiment will be described in more detail with reference to FIGS. 10(1) to 12.

Figure 10:
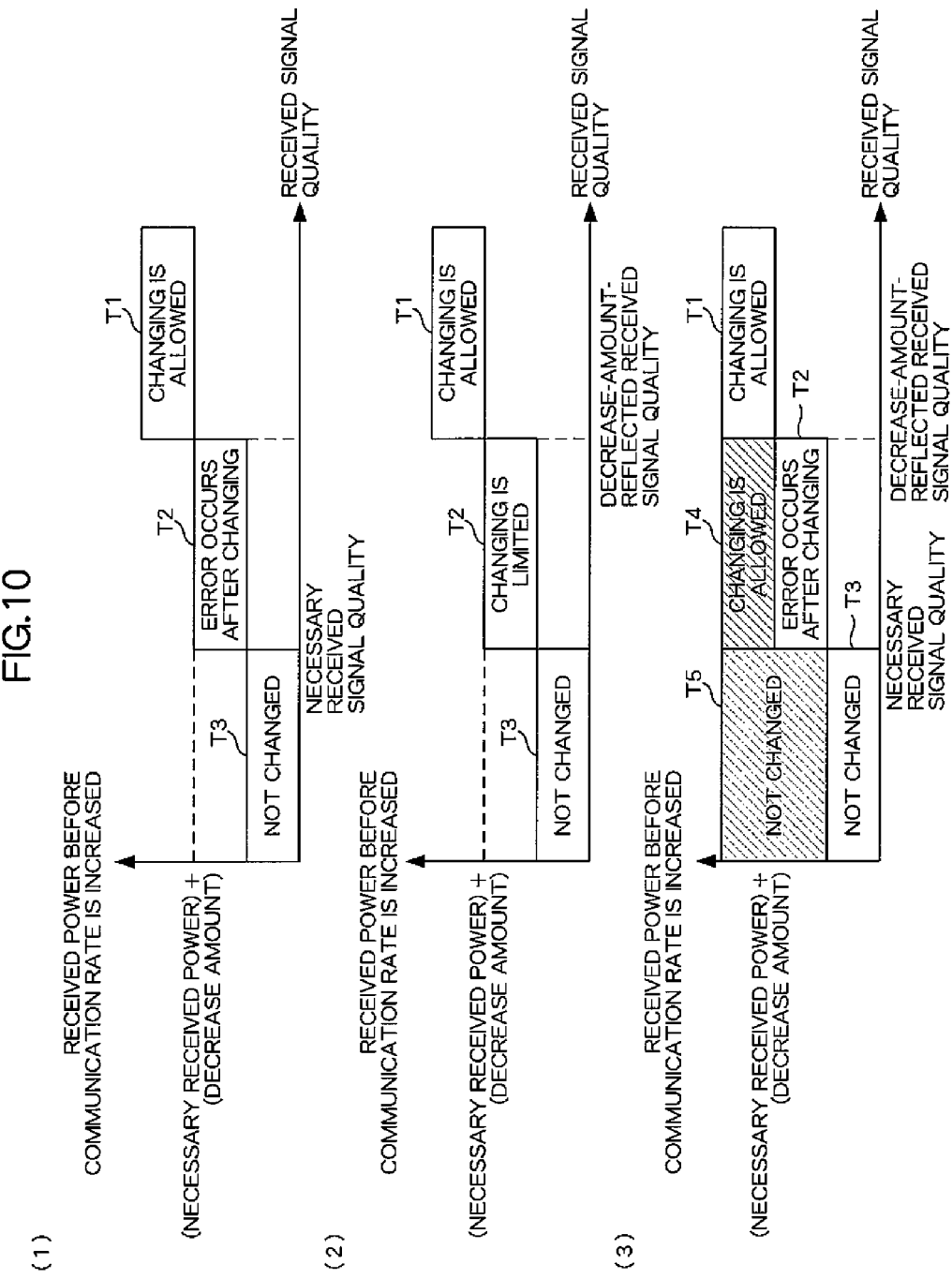
FIG. 10 is an explanatory diagram showing an operation and effect of the embodiment of the present invention, and particularly, showing a relationship between received power and received signal quality.

FIG. 10 is an explanatory diagram showing a relationship between the received power and the received signal quality. In FIG. 10, the vertical axis indicates received power before the communication rate is increased, and the horizontal axis indicates received signal quality.

FIG. 10(1) shows a case where a threshold of the received signal quality, used to judge whether it is allowed to increase the communication rate, is set as the necessary received signal quality. When the communication rate is increased, the received power is decreased by a transmission power decrease amount. Therefore, to obtain necessary received power after the communication rate is increased, the received power before the communication rate is increased needs to be at least the sum of the necessary received power and the transmission power decrease amount.

When the received power before the communication rate is increased is equal to or larger than the sum of the necessary received power and the transmission power decrease amount, even after the communication rate is increased because the received signal quality is higher than the necessary received signal quality, the base station device 10 and the mobile station device 20 can continue to perform the communication without problems (region T1). On the other hand, when the received power before the communication rate is increased is smaller than the sum of the necessary received power and the transmission power decrease amount, after the communication rate is increased because the received signal quality is higher than the necessary received signal quality, the received power is smaller than the necessary received power. As a result, an error occurs (region T2). Note that, in the mobile communication system 1, when the received signal quality is lower than the necessary received signal quality, the communication rate is prevented from being increased (region T3).

FIG. 10(2) shows a case where a threshold of the received signal quality, used to judge whether it is allowed to increase the communication rate, is set as the decrease-amount-reflected received signal quality. In this case, a change in the communication rate is limited in the region T2. Therefore, an error does not occur unlike the case shown in FIG. 10(1).

The cases where the correlation between the received signal quality and the received power is maintained have been described with reference to FIG. 10(1) and FIG. 10(2). However, in practice, even when the received power is increased, the received signal quality is not necessarily increased. FIG. 10(3) is an explanatory diagram showing such a case. In a region T4 shown in FIG. 10(3), even though the received signal quality does not reach the decrease-amount-reflected received signal quality, the received power is larger than the sum of the necessary received power and the transmission power decrease amount. In this case, the communication rate can be increased according to this embodiment. After the communication rate is thus increased, the base station device 10 and the mobile station device 20 can continue to perform the communication without problems. Note that, in FIG. 10(3), although the relationship between the received signal quality and the received power may correspond to a region T5, the communication rate is prevented from being increased in that case in the mobile communication system 1.

Figure 11:
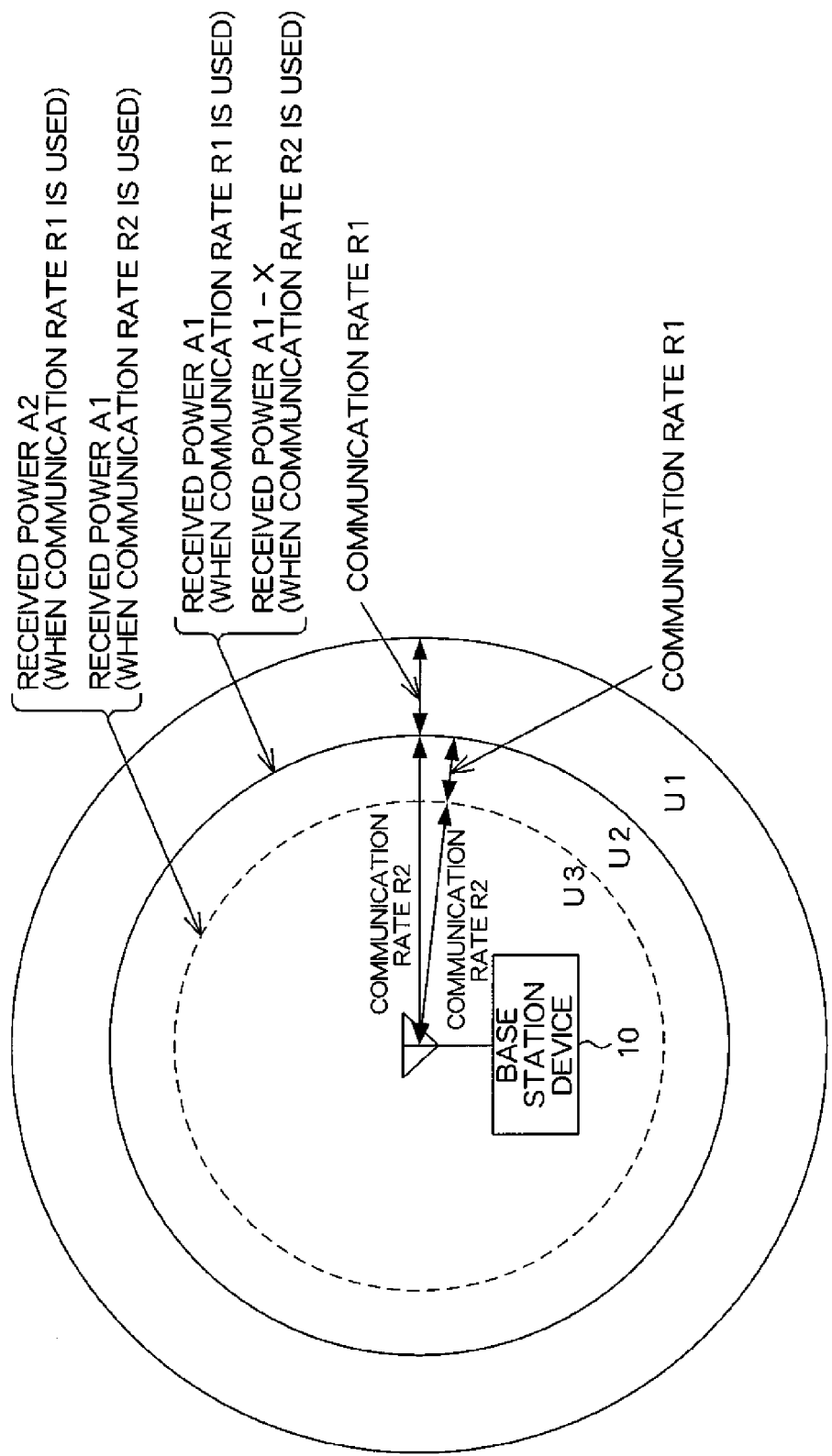
FIG. 11 is an explanatory diagram showing an operation and effect of the embodiment of the present invention, and particularly, showing a relationship between a change in communication rate and a distance between the base station device and the mobile station device.

FIG. 11 is an explanatory diagram showing a relationship between the change in communication rate and the distance between the base station device 10 and the mobile station device 20. If there is no obstacle or the like, when the base station device 10 sends a signal by using a fixed transmission power, the received power obtained when the mobile station device 20 receives the signal sent by the base station device 10 is proportional to the distance between the base station device 10 and the mobile station device 20.

It is assumed that the mobile station device 20 is located in a region U1 at first and then gradually comes close to the base station device 10. In the region U1, a communication rate is R1. The received power of the mobile station device 20 becomes the necessary received power A1 for a communication rate R2 at the boundary of the region U1 and a region U2. The received signal quality corresponding to this received power is the necessary received signal quality B1 for the communication rate R2. When the judgment of the necessary received signal quality is performed based on the threshold, the communication rate is changed from R1 to R2 at this boundary. However, when the communication rate is changed to R2, the transmission power of the base station device 10 is decreased by the transmission power decrease amount X. As a result, the received power of the mobile station device 20 becomes A1-X, thereby making it impossible for the base station device 10 to successfully perform reception.

Therefore, in the mobile communication system 1, a change in the communication rate is limited until the received power of the mobile station device 20 becomes A2 (=A1+X). As a result, when the mobile station device 20 crosses the boundary of the region U2 and a region U3, the communication rate is changed from R1 to R2. Because the received power of the mobile station device 20 is A2 (=A1+X) at this time, even when the transmission power decrease amount X is decreased, the received power that is equal to or larger than the necessary received power A2 can be secured, thereby successfully continuing the communication.

Figure 12:
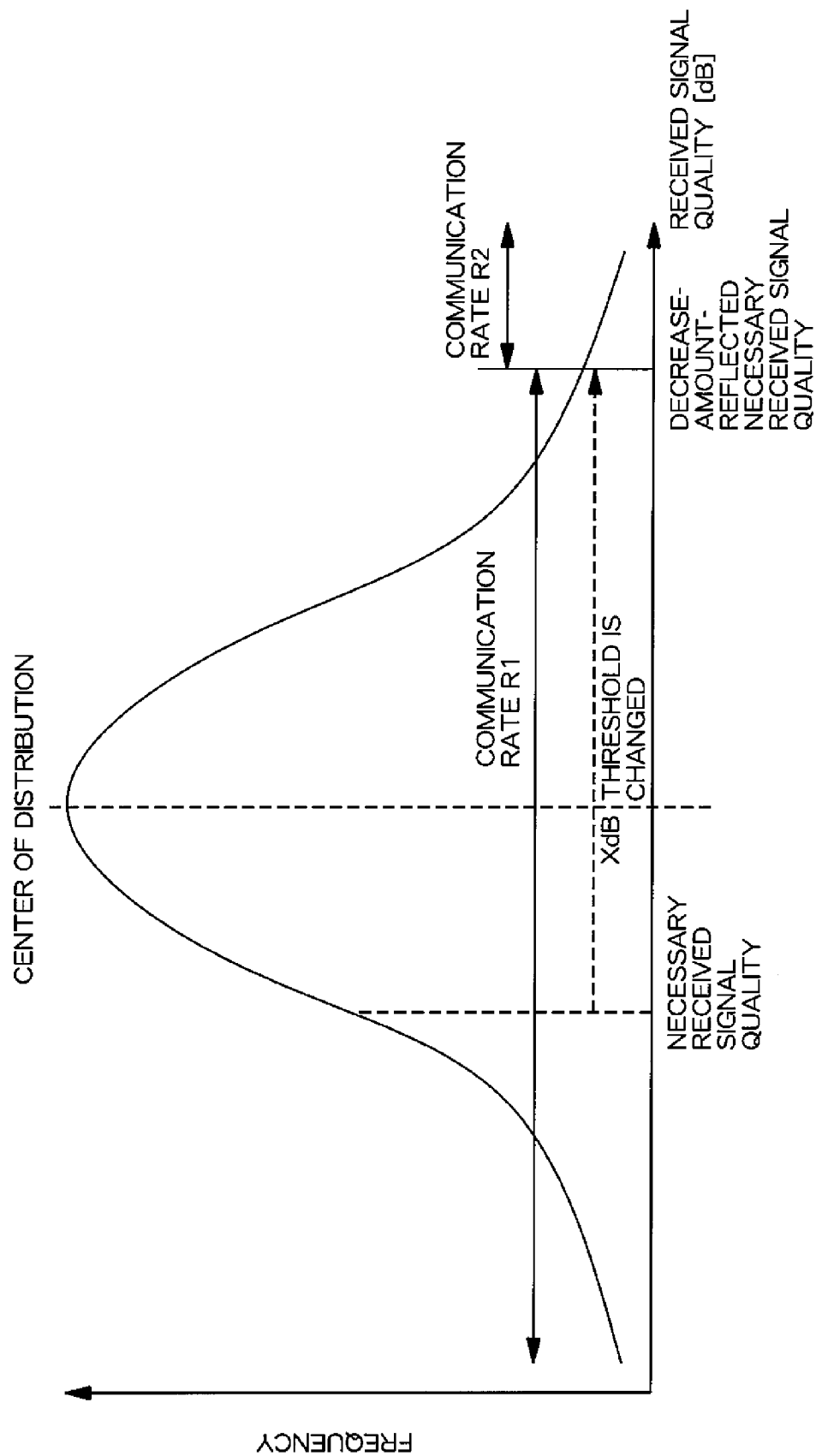
FIG. 12 is an explanatory diagram showing an operation and effect of the embodiment of the present invention, and particularly, showing a correlation between the received signal quality and the received power.

Lastly, FIG. 12 is an explanatory diagram showing a correlation between the received signal quality and the received power. In FIG. 12, the horizontal axis indicates the received signal quality and the vertical axis indicates the frequency of hardware appearances.

In general, when the received power is increased to a certain level or more, the received signal quality is saturated depending on the hardware. FIG. 12 shows a hardware distribution in terms of saturated received signal quality. In FIG. 12, the center of the distribution is positioned between the necessary received signal quality and the decrease-amount-reflected necessary received signal quality. In order to make it possible to change the communication rate from R1 to R2 through the judgment based on a threshold, in which the decrease-amount-reflected received signal quality is used as the threshold, the saturated received signal quality needs to be higher than the decrease-amount-reflected received signal quality. However, there exist only a few pieces of hardware that satisfies this condition. Therefore, in the mobile communication system 1, when it is secured that only the received power is larger than the necessary received power, the necessary received signal quality is used as the threshold. This makes it possible, for many pieces of hardware, to change the communication rate from R1 to R2.

Note that the present invention is not limited to the above-mentioned embodiment. Although the description has been given of the example case where the present invention is applied, for example, to a mobile communication system in the above-mentioned embodiment, the present invention can be applied to any communication system that employs adaptive modulation. Further, in the example case where the present invention is applied to a mobile communication system, the description has been given of the case where the mobile station device 20 serves as a reception device in the above-mentioned embodiment. However, the present invention can also be applied in a similar manner to a case where the base station device 10 serves as a reception device.

The invention claimed is:

1. A communication system, comprising:
a transmission device; and
a reception device,
   the transmission device comprising:
      modulation means for modulating transmission data by using any of a plurality of modulation schemes to generate a transmission signal;
      transmission means for sending the transmission signal generated by the modulation means; and
      transmission power decreasing means for decreasing transmission power used when the transmission means sends the transmission signal by a predetermined change amount, in a case where a communication rate is increased by changing the modulation scheme used by the modulation means;
   the reception device comprising reception means for receiving the transmission signal sent by the transmission means,
wherein the communication system further comprises:
received power information acquisition means for obtaining received power information indicating received power obtained when the transmission signal is received by the reception means;
communication rate modification means for changing, in a predetermined case, the communication rate by changing the modulation scheme used by the modulation means; and
communication rate increase limit means for limiting the communication rate to be increased by the communication rate modification means, according to received power required for the reception device to demodulate the transmission signal received by the reception means and according to the received power obtained when the reception means receives the transmission signal after the communication rate is changed by the communication rate modification means and predicted based on the received power information obtained by the received power information acquisition means and based on the change amount of the transmission power by the transmission power decreasing means.

2. The communication system according to claim 1, further comprising:
received signal quality information acquisition means for obtaining received signal quality information indicating received signal quality obtained when the transmission signal is received by the reception means;
storage means for storing necessary received signal quality information indicating necessary received signal quality being received signal quality required for the reception device to demodulate the transmission signal received by the reception means, in association with communication rate information indicating the communication rate; and
judgment means for performing, for the received signal quality indicated by the received signal quality information obtained by the received signal quality information acquisition means, judgment based on a threshold, with the necessary received signal quality indicated by the necessary received signal quality information stored in the storage means in association with the communication rate information indicating the communication rate changed by the communication rate modification means or high received-signal quality that is higher than this necessary received signal quality being used as the threshold, wherein:

the communication rate modification means changes the communication rate according to a judgment result of the judgment means;

in a case where the predicted received power is not larger than the received power required for the reception device to demodulate the transmission signal received by the reception means, the communication rate increase limit means limits the communication rate to be increased by the communication rate modification means, by setting the threshold used in the judgment performed by the judgment means as the high received-signal quality; and in a case where the predicted received power is larger than the received power required for the reception device to demodulate the transmission signal received by the reception means, the communication rate increase limit means sets the threshold used in the judgment performed by the judgment means as the necessary received signal quality.

3. The communication system according to claim 2, wherein the high received-signal quality is determined based on the necessary received signal quality and the change amount of the transmission power by the transmission power decreasing means.

4. A communication device, comprising:

reception means for receiving a transmission signal sent by a transmission device;

received power information acquisition means for obtaining received power information indicating received power obtained when the transmission signal is received by the reception means;

communication rate modification means for changing, in a predetermined case, a communication rate by changing a modulation scheme used by the transmission device to modulate the transmission signal; and communication rate increase limit means for limiting the communication rate to be increased by the communication rate modification means, according to received power required for the reception device to demodulate the transmission signal received by the reception means and according to the received power obtained when the reception means receives the transmission signal after the communication rate is changed by the communication rate modification means and predicted based on the received power information obtained by the received power information acquisition means and based on a change amount of the transmission power of the transmission signal decreased by the transmission device according to an increase of the transmission rate by the communication rate modification means.

5. A communication rate modification method, comprising:

a modulation step of modulating, in a transmission device, transmission data by using any of a plurality of modulation schemes, to generate a transmission signal;

a transmission step of sending, in the transmission device, the transmission signal generated in the modulation step;

a transmission power decreasing step of decreasing transmission power used when the transmission signal is sent in the transmission step, by a predetermined change amount, in a case where a communication rate is increased by changing the modulation scheme used in the modulation step;

a reception step of receiving, in a reception device, the transmission signal sent by the transmission means;

a received power information acquisition step of obtaining received power information indicating received power obtained when the transmission signal is received in the reception step;

a communication rate modification step of changing, in a predetermined case, the communication rate by changing the modulation scheme used in the modulation step; and a communication rate increase limit step of limiting the communication rate to be increased in the communication rate modification step, according to received power required for the reception device to demodulate the transmission signal received in the reception step and according to the received power obtained when the transmission signal is received in the reception step after the communication rate is changed in the communication rate modification step and predicted based on the received power information obtained in the received power information acquisition step and based on the change amount of the transmission power in the transmission power decreasing step.

* * * * *